United States Patent [19]
Deng

[11] Patent Number: 5,864,250
[45] Date of Patent: Jan. 26, 1999

US005864250A

[54] NON-SERVO CLOCK AND DATA RECOVERY CIRCUIT AND METHOD

[75] Inventor: Jay Jie Deng, Union City, Calif.

[73] Assignee: Advanced Communications Devices Corporation, Fremont, Calif.

[21] Appl. No.: 814,930

[22] Filed: Mar. 12, 1997

Related U.S. Application Data

[60] Provisional application No. 60/018,070 May 21, 1996.
[51] Int. Cl. [6] ....................................................... H04L 7/02
[52] U.S. Cl. ........................... 327/165; 327/166; 375/359
[58] Field of Search .................................... 327/165, 166, 327/141, 144, 150, 154, 159; 375/359, 360

[56] References Cited

U.S. PATENT DOCUMENTS

| | | | |
|---|---|---|---|
| 4,696,016 | 9/1987 | Rozema et al. | 375/20 |
| 5,608,357 | 3/1997 | Ta et al. | 331/2 |
| 5,671,258 | 9/1997 | Burns et al. | 375/359 |
| 5,671,259 | 9/1997 | Thomas et al. | 327/165 |

*Primary Examiner*—Tuan T. Lam
*Attorney, Agent, or Firm*—Gary S. Williams; Flehr Hohbach Test Albritton & Herbert LLP

[57] ABSTRACT

A clock and data recovery circuit has an input port for receiving a data signal representing a sequence of data values, a pulse generator, a clock generator and a data storage element. The pulse generator generates a pulse whenever a data value change is detected in the received data signal. The clock generator generates a clock signal having an associated frequency and phase. The clock generator receives each pulse produced by the pulse generator so as to synchronize the clock signal's phase with data value changes on the input port. The data storage element stores data values in the data signal at times dictated by the generated clock signal. The data values stored by the data storage element is the recovered data signal and the generated clock signal is the recovered clock signal. The pulse generator and clock signal generator interoperate so as to bound jitter in the recovered clock signal caused by any jitter in the received data signal so that the data values in the received data signal are stored during a data capture time window whose phase position is automatically compensated for the any jitter in the received data signal.

14 Claims, 3 Drawing Sheets

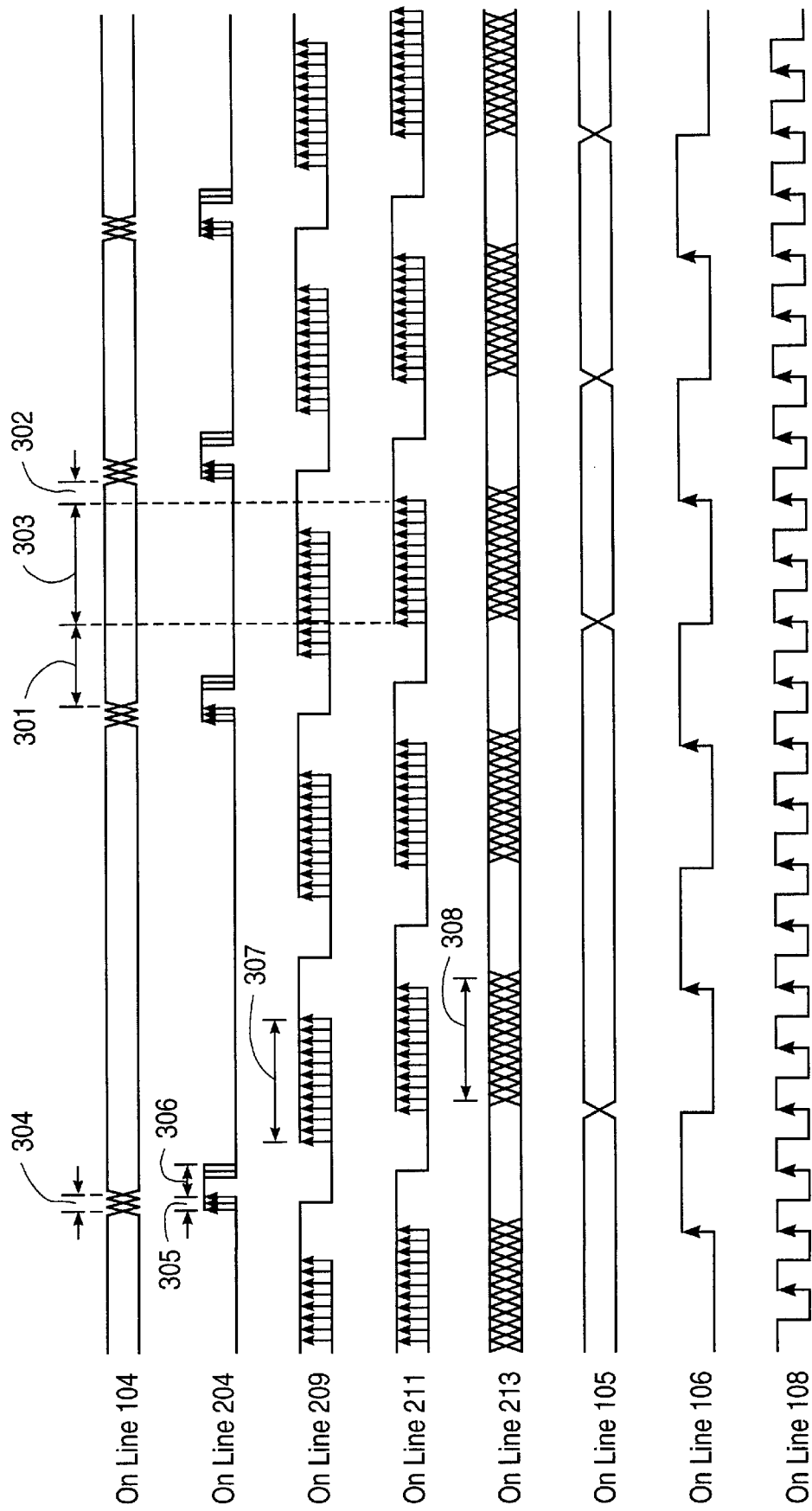

NON-SERVO CLOCK AND DATA RECOVERY CIRCUIT AND METHOD

This application claims priority from U.S. provisional application 60/018,070, filed May 21, 1996.

The present invention relates generally to recovering data and clock signals from a received serial data stream, and in particular relates to a circuit and method for data and clock recovery that avoids the use of a phase locked loop while remaining highly immune to jitter in the received data stream.

BACKGROUND OF THE INVENTION

Wherever data is transmitted over a long distance, a clock signal must be embedded in the data stream. As long as the transition density is not too low, the receiving system can recover both clock and data effectively.

To perform clock and data recovery from a serial data stream, the conventional approach is to use analog Phase-Locked Loops and Delay-Locked Loops as well as digital Phase-Locked Loops and Delay-Locked Loops. Both oversampling and non-oversampling schemes have been used. In general, prior art oversampling and non-oversampling methods rely on some kind of servo control loop.

In contrast, the present invention uses transitions in the received signal to directly control a digital circuit rather than to adjust a servo system. This new circuit and method is speed scalable and technology portable. The speed can start from very low to adequately high. For example, when implemented as a semiconductor circuit using a standard 0.5 um CMOS process, the present invention can achieve clock and data recovery from a high speed, 125 Mbps data signal. The same circuit structure is also portable to various integrated circuit technologies including BiCMOS, Bipolar, GaAs, GeSi and most other types of digital IC fabrication technology. The present invention works well with any line coding scheme having reasonable transition density.

SUMMARY OF THE INVENTION

In summary the present invention is a clock and data recovery circuit having an input port for receiving a data signal representing a sequence of data values, a pulse generator, a clock generator and a data storage element. The pulse generator generates a pulse whenever a data value change is detected in the received data signal. The clock generator generates a clock signal having an associated frequency and phase. The clock generator receives each pulse produced by the pulse generator so as to synchronize the clock signal's phase with data value changes on the input port. Finally, the data storage element stores data values in the data signal at times dictated by the generated clock signal. The data values stored by the data storage element is the recovered data signal and the generated clock signal is the recovered clock signal. The pulse generator and clock signal generator interoperate so as to bound jitter in the recovered clock signal caused by any jitter in the received data signal so that the data values in the received data signal are stored during a data capture time window whose phase position is automatically compensated for the any jitter in the received data signal.

BRIEF DESCRIPTION OF THE DRAWINGS

Additional objects and features of the invention will be more readily apparent from the following detailed description and appended claims when taken in conjunction with the drawings, in which:

FIG. 3 is a timing diagram showing waveforms on selected nodes of the circuit shown in FIG. 2.

DESCRIPTION OF THE PREFERRED EMBODIMENTS

Figure 1:
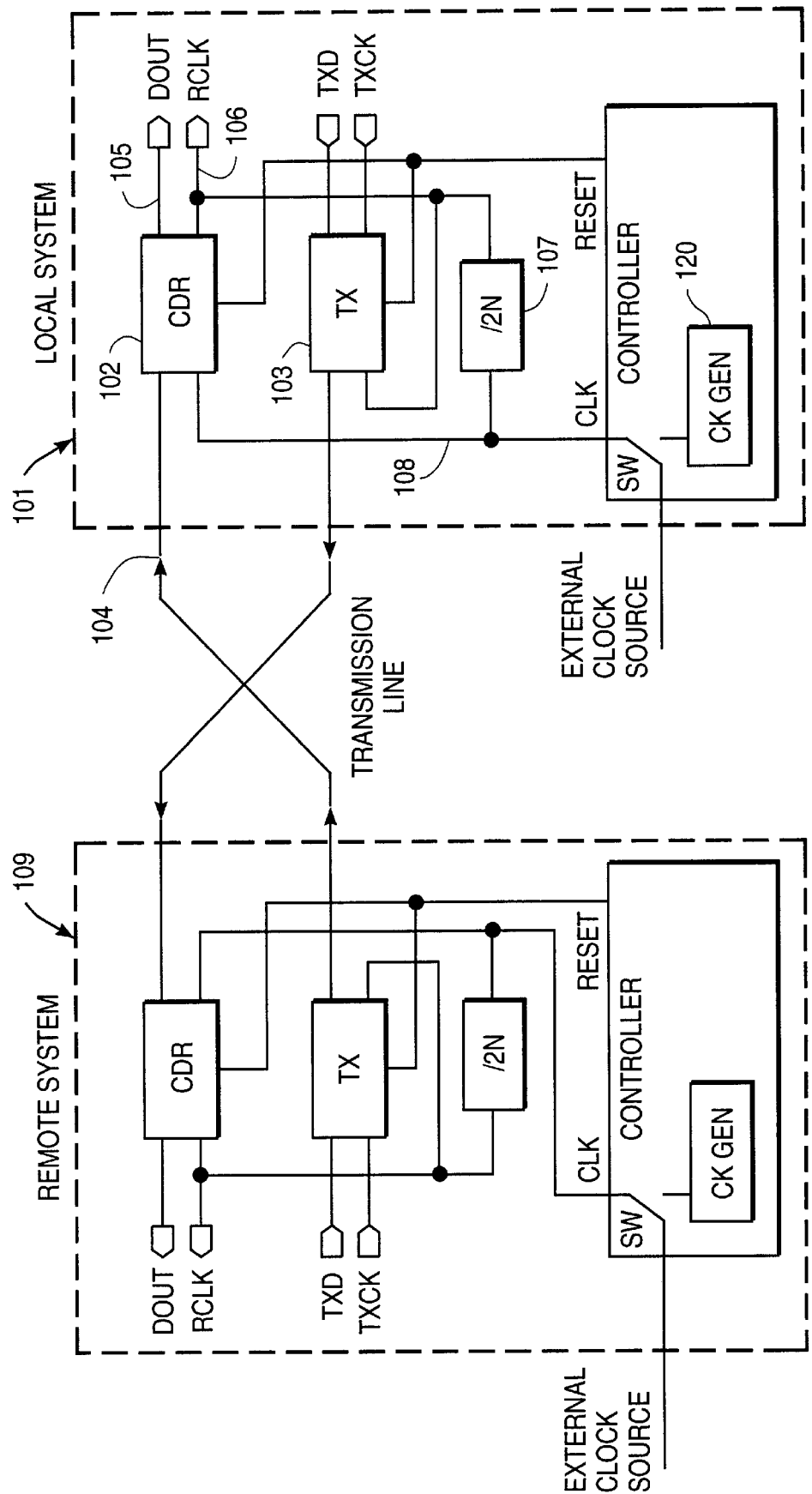
FIG. 1 is a block diagram of a data transmission system.

Referring to FIG. 1, a remote system 109 and a local system 101 are shown in FIG. 1. The remote system 109 sends a serial data stream with embedded clock through line 104 to the local system 101. The local system 101 has a clock and data recovery circuit 102 and a transmitter 103. The clock and data recovery circuit 102 recovers clock and data signals from the serial data stream sent by the remote system 109.

A clock frequency divider 107 divides the frequency of a clock signal on line 108 by a factor 2N, such as 4, to produce a reduced frequency clock signal RCLK that is used to read recovered data from the clock and data recovery circuit 102 and is also used to govern the rate and timing of data transmissions by the transmitter 103. The RCLK signal on line 106 is distinct from the recovered clock signal generated and used internally by the clock and data recovery circuit 102.

Figure 2:
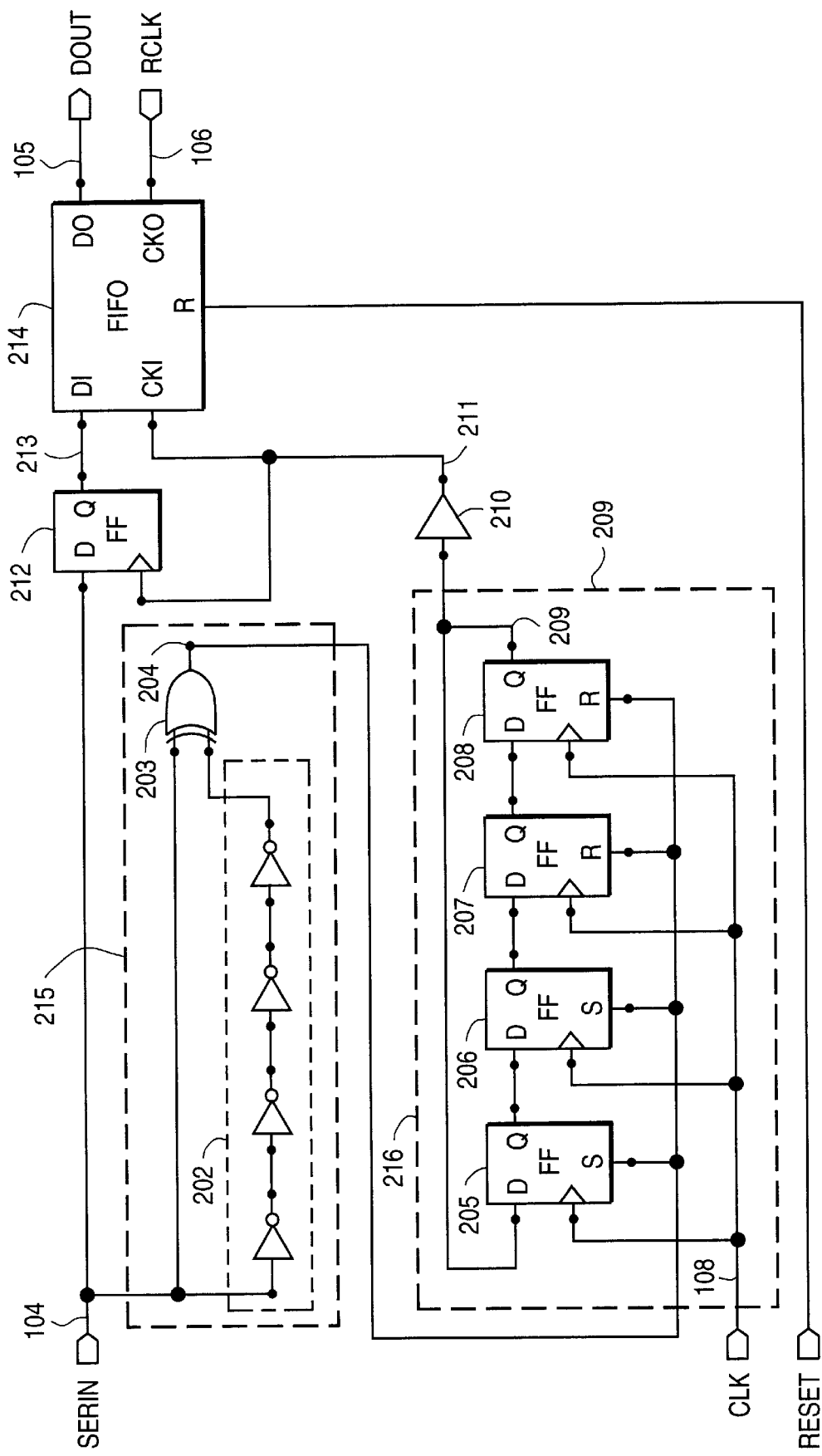
FIG. 2 is a block diagram of a preferred embodiment of the data and clock recovery circuit of the present invention.

Referring to FIG. 1 and FIG. 2, a serial data stream with embedded clock comes into input line 104 and is received by a line state change converter 215 (also called a transition detector). The line state change converter 215 converts any state change on input line 104 into a short pulse and output this short pulse on line 204.

A ring shift register 216, also herein called a recovery clock generator, is clocked by a local system clock input on line 108. In the preferred embodiment, half of the total number of flip-flops of the ring shift register 216 are D type flip-flops with a set pin and another half are D-type flip-flops with a reset pin. When there is no line state change on line 104, there is no pulse output on line 204. The ring shift register 216 is free running, driven by the local system clock input on line 108. Typically, the frequency of the local system clock signal on line 108 will be 2N times the expected data bit frequency in the received data stream, where 2N is the number of flip-flops in the ring shift register 216. As indicated in FIG. 1, the local system clock on line 108 may be provided either from an external source, or from a local clock signal generator circuit 120.

When there is a line state change on line 104, either a 1-to-0 state change or a 0-to-1 state change, the line state change converter 215 generates a short pulse on line 204 immediately after the state change on line 104. This pulse on line 204 synchronizes the ring shift register 216 output on line 209 with the received serial data stream with embedded clock on line 104. The output of ring shift register 216 on line 209 serves as a recovered clock. The right shift register output is buffered by clock buffer 210 to generate a recovered clock signal. The buffered recovered clock signal on line 211 is used to capture the data on line 104 by a data capture flip-flop 212. The output of the data capture flip-flop 212 on line 213 is the recovered data.

Both the buffered recovered clock on line 211 and recovered data on line 213 have bounded jitter in them. To filter out the jitter in the recovered clock and data signals, a one bit wide synchronization FIFO (first in first out) buffer 214 is used. The depth of the synchronization FIFO 214 can be two or more data entries. The selection of the depth of the synchronization FIFO 214 depends on the maximum possible frequency difference of the incoming embedded clock on line 104 and the local FIFO read clock on line 106. It also depends on the maximum length of each data packet on line 104. The final recovered data will be the data output on line 105 of the synchronization FIFO 214.

The final recovered clock signal has the same frequency, but not necessarily the same phase as the local FIFO read clock signal on line 106 of the synchronization FIFO 214. This FIFO read clock signal on line 106 is derived from the local system clock signal on line 108 by dividing the local system clock on line 108 by 2N, where N is an integer greater than or equal to 2. The FIFO read clock on line 106 and the final recovered data on line 105 are completely synchronized with the receiving end of local system 101.

The line state change converter 215 consists of a delay chain 202 and an exclusive-or gate 203. A positive pulse is generated by any change of state on line 104. The pulse width is proportional to the delay time of the delay chain 202.

The ring shift register 216 consists of an even number, 2N, of serially connected flip-flops, where N is an integer greater than or equal to two. In FIG. 2, N is chosen as two, so the total number of flip-flops is equal to four. Half of the total number flip-flops have a set pin, while the other half have a reset pin. In FIG. 2, two flip-flops 205 and 206 have a set pin, while the other two flip-flops 207 and 208 have a reset pin. While D-type flip-flops are used in the preferred embodiment shown in FIG. 2, any other type of flip-flops or circuits which can perform the same function as described above can also be utilized. Also, in implementations where the number of flip-flops in the ring shift register is relatively large, such as eight or more, the number of flip-flops with set pins and the number with reset pins need not be equal. In other words, the waveform generated need not be a square wave, so long as the timing of the data capture edge of the generated clock signal is properly timed relative to transitions in the received signal for accurate data recovery.

The set pins of flip-flops 205 and 206 and the reset pins of flip-flops 207 and 208 are tied together and are driven by the output of line state change converter 215 through line 204. A recovered clock is therefore generated by ring shifting the bits set and reset in the flip-flops 205–208 and outputting the signal from one of these flip-flops to line 209.

The waveforms on critical nodes are shown in FIG. 3. The incoming serial data stream with embedded clock on line 104 changes state at time points indicated by crosses on the first trace. This signal on line 104 has jitter 304. For every state change on input line 104, a positive pulse is generated and this pulse also has the same amount of jitter 305 as the jitter 304 on line 104. The width of this pulse is indicated by time interval 306. Because the incoming signal on line 104 is asynchronous with regarding to the local clock on line 108, the recovered clock on line 209 has more jitter 307 than the input signal. This jitter 307 is bounded, however, which means it is referenced to the state changes on line 104. The recovered clock jitter 307 on line 209 is limited to a predefined range. This guarantees that all sampling rising edges will fall within a required sampling window 303. As a result, the minimum setup time 301 and the minimum hold time 302 are guaranteed for the data capturing flip-flop 212. The initial recovered data on line 213 is also jittery as indicated by crosses 308 in FIG. 3. The buffered recovered clock 211 is used to write the recovered data 213 into FIFO 214. The FIFO read clock signal 211 and the final recovered data 105 are very clean. They have as little jitter as the local system clock 108 does.

The received serial data stream on line 104 is clocked by a remote system clock which has a frequency of Fr. The local system clock has a frequency Fl. Due to the fact that these two clocks have different sources, Fr and Fl may not be the same. Fr and Fl may not even have an exact integer time relationship. The relationship between Fr and Fl can be represented as follows:

$$Fl=2N*Fr+df; N=2,3,4,$$

where df is the frequency difference. The maximum magnitude of df represents the frequency tolerance of a clock and data recovery system.

When the maximum frequency difference is very small and the data packet size is also small, the synchronization FIFO is not needed and the recovered data is obtained from line 213.

Compared to the traditional analog or digital phase-lock loop approaches for recovering clock and data from a single bit stream, the present invention has several advantages:

1) the present invention has much more jitter tolerance on the incoming serial data stream;

2) the present invention has much more frequency difference tolerance between local and remote systems;

3) the present invention requires much less circuit resources than any other known clock and data recovery technology; and 4) due to the simplicity of the present invention, system reliability is greatly enhanced.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A clock and data recovery circuit, comprising:

an input port for receiving a data signal representing a sequence of data values;

a pulse generator coupled to the input port for generating a pulse when a data value change is detected in the received data signal;

a clock generator, coupled to the pulse generator, that generates a clock signal having an associated frequency and phase, the clock generator receiving the pulse from the pulse generator so as to immediately, upon receiving the pulse, synchronize the generated clock signal's phase with data value changes on the input port using a data capture flip-flop; the clock generator including a recirculating shift register that stores the generated clock signal having a phase that is set by the pulse; and a data storage element, coupled to the data capture flip-flop and the clock generator, that stores the data values in the data signal at times dictated by the generated clock signal, the data values stored by the data storage element comprising a recovered data signal and the generated clock signal comprising a recovered clock signal.

2. The clock and data recovery circuit of claim 1, the data storage element including a first-in-first-out buffer for storing the data values in the data signal at times governed by the generated clock signal, and for reading out the stored data values at times governed by a distinct data read clock signal, the first-in-first-out buffer storing at least two data values in the data signal in successive cycles of the recovered clock signal and providing synchronization of the recovered data signal with the distinct data read clock signal.

3. The clock and data recover circuit of claim 1, wherein the clock generator responds to the pulse by imposing a phase change in the generated clock signal corresponding to a leading edge of the pulse.

4. The clock and data recover circuit of claim 1, wherein the clock generator sets the generated clock signal's phase relative to a most recent data value change in the received data signal without regard to the generated clock signal's phase prior to the most recent data value change.

5. A clock and data recover circuit, comprising:

an input port for receiving a data signal representing a sequence of data values;

a pulse generator coupled to the input port for generating a pulse when a data value change is detected in the received data signal;

a clock generator, coupled to the pulse generator, that generates a clock signal having an associated frequency and phase, the clock generator receiving the pulse from the pulse generator so as to immediately, upon receiving the pulse, synchronize the generated clock signal's phase with the data value changes on the input port using a data capture flip-flop; and a data storage element, coupled to the data capture flip-flop and the clock generator, that stores data values in the data signal at times dictated by the generated clock signal, the data values stored by the data storage element comprising a recovered data signal and the generated clock signal comprising a recovered clock signal;

the clock generator including a shift register having 2N sequentially connected storage elements, where N is a positive integer, with a last one of the storage element's data output connected to a first one of the storage element's data input, the shift register being clocked by an externally sourced clock signal having a clock frequency greater than a data frequency associated with the data signal;

a first subset of the shift register storage elements having a reset port coupled to receive the pulse so as to reset their respective outputs to a first boolean value and a second subset of the shift register storage elements having a set port coupled to receive the pulse so as to set their respective outputs to a second boolean value that is the boolean negation of the first boolean value.

6. The clock and data recover circuit of claim 5, wherein the externally sourced clock signal that clocks the shift register has a clock frequency equal to approximately 2N times a data frequency associated with the data signal.

7. The clock and data recover circuit of claim 1, the pulse generator and the clock generator interoperating so as to bound jitter in the generated clock signal created by any jitter in the received data signal so that the data storage element stores the data values in the data signal during a data capture time window whose phase position is automatically compensated for the any jitter in the received data signal.

8. A clock and data recovery method, comprising the steps of:

receiving a data signal representing a sequence of data values;

generating a pulse when a data value change is detected in the received data signal;

generating a recovered clock signal having an associated frequency and phase, including receiving the pulse and immediately, upon receiving the pulse, synchronizing the recovered clock signal's phase with the pulse so as to synchronize the recovered clock signal's phase with the data value changes in the received data signal using a data capture flip-flop; the recovered clock signal generating step including generating the recovered clock signal using a recirculating shift register, storing in the recirculating shift register the recovered clock signal having a phase that is set by the pulse; and storing the data values in the data signal at times dictated by the recovered clock signal, the stored data values comprising a recovered data signal.

9. The method of claim 8, the storing step including storing the data values in the data signal in a first-in-first-out buffer at times governed by the recovered clock signal, and reading out the stored data values at times governed by a distinct data read clock signal, the first-in-first-out buffer storing at least two data values in the data signal in successive cycles of the recovered clock signal and providing synchronization of the recovered data signal with the distinct data read clock signal.

10. The method of claim 8, the recovered clock signal generating step including immediately responding to the pulse by imposing a phase change in the generated recovered clock signal corresponding to a leading edge of the pulse.

11. The method of claim 8, the recovered clock signal generating step including setting the recovered clock signal's phase relative to a most recent data value change in the received data signal without regard to the recovered clock signal's phase prior to the most recent data value change.

12. A clock and data recovery method, comprising the steps of:

receiving a data signal representing a sequence of data values;

generating a pulse when a data value change is detected in the received data signal;

generating a recovered clock signal having an associated frequency and phase, including receiving the pulse and immediately, upon receiving the pulse, synchronizing the recovered clock signal's phase with the pulse so as to synchronize the recovered clock signal's phase with data value changes in received data signal using a data capture flip-flop; and storing data values in the data signal at times dictated by the recovered clock signal, the stored data values comprising a recovered data signal;

the recovered clock signal generating step including generating the recovered clock signal using a shift register having 2N sequentially connected storage elements, where N is a positive integer, with a last one of the storage element's data output connected to a first one of the storage element's data input, the shift register being clocked by an externally sourced clock signal having a clock frequency greater than a data frequency associated with the received data signal; a first subset of the shift register storage elements having a reset port coupled to receive the pulse so as to reset their respective outputs to a first boolean value and a second subset of the shift register storage elements having a set port coupled to receive the pulse so as to set their respective outputs to a second boolean value that is the boolean negation of the first boolean value.

13. The method of claim 12, wherein the externally sourced clock signal that clocks the shift register has a clock frequency equal to approximately 2N times a data frequency associated with the received data signal.

14. The method of claim 12, wherein the pulse generating and recovered clock signal generating steps interoperate so as to bound jitter in the recovered clock signal caused by any jitter in the received data signal so that the data values in the received data signal are stored by the storing step during a data capture time window whose phase position is automatically compensated for the any jitter in the received data signal.

* * * * *